United States Patent [19]
Sibik et al.

[11] Patent Number: 5,813,241
[45] Date of Patent: Sep. 29, 1998

[54] CRYTALLIZATION DETECTION AND RECOVERY FOR TWO-STAGE ABSORPTION REFRIGERATION MACHINE

[75] Inventors: Lee Sibik; Mark Berget, both of Onalaska, Wis.

[73] Assignee: Gas Research Institute, Chicago, Ill.

[21] Appl. No.: 823,084

[22] Filed: Mar. 24, 1997

[51] Int. Cl.[6] ............................................... F25B 15/00
[52] U.S. Cl. ............................................. 62/148; 62/141
[58] Field of Search .......................... 62/141, 148, 101, 62/476, 489

[56] References Cited

U.S. PATENT DOCUMENTS

| | | | |
|---|---|---|---|
| 2,582,837 | 1/1952 | Leonard, Jr. | 62/5 |
| 3,300,999 | 1/1967 | Reid, Jr. | 62/141 |
| 3,604,216 | 9/1971 | Porter | 62/141 |
| 3,626,710 | 12/1971 | Porter | 62/141 |
| 3,626,711 | 12/1971 | Porter et al. | 62/141 |
| 4,328,679 | 5/1982 | Usui et al. | 62/141 |
| 4,914,919 | 4/1990 | Walfridson et al. | 62/236 |
| 5,255,534 | 10/1993 | Ryan | 62/476 |
| 5,275,010 | 1/1994 | Hisajima et al. | 62/148 |
| 5,551,254 | 9/1996 | Inoue | 62/489 |
| 5,623,426 | 4/1997 | Ozawa et al. | 364/557 |

FOREIGN PATENT DOCUMENTS

| | | | |
|---|---|---|---|
| 405157416 | 6/1993 | Japan | 62/141 |
| 406147682 | 5/1994 | Japan | 62/141 |
| 406159850 | 6/1994 | Japan | 62/141 |

*Primary Examiner*—William Doerrler
*Attorney, Agent, or Firm*—Speckman Pauley Petersen & Fejer

[57] ABSTRACT

A crystallization detection and recovery method for a two-stage absorption refrigeration machine is provided. Crystallization in the low temperature heat exchanger is detected through temperature comparisons between certain absorbent solution flows. The recovery sequence includes steps to remove crystallization and to prevent subsequent occurrences.

9 Claims, 2 Drawing Sheets

CRYTALLIZATION DETECTION AND RECOVERY FOR TWO-STAGE ABSORPTION REFRIGERATION MACHINE

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

BACKGROUND OF THE INVENTION

This invention relates to a two-stage absorption refrigeration machine and, more particularly, to a control system for detecting and recovering from crystallization within a system heat exchanger. During operation of a two-stage absorption refrigeration machine, the occurrence of accidents or malfunctions can cause solidification or crystallization of absorption solution in the flow passages of the machine. One of the most common sites for crystallization is in the concentrated solution passage of the concentrated solution heat exchanger. At this point, the absorption solution has been concentrated by the generators and is being forced back to the absorber. Between the generators and the absorber, the concentrated solution passes through a heat exchanger, releasing heat to dilute absorbent solution being pumped to the generators from the absorber. If for some reason the absorbent solution becomes too concentrated or it is cooled below its crystallization temperature, the concentrated solution flow passage begins to block and eventually closes completely due to crystallization. This condition can occur over a period of very few minutes and has been known to occur in less than a minute.

A number of conditions can cause crystallization of the concentrated absorbent solution in the heat exchanger. For example, the presence of air or other inert gas in the absorber will prevent dilution of the absorbent solution therein. This will cause the concentration of a concentrated absorbent solution to rise. As the solution becomes supersaturated, it will begin to crystallize. If the condenser water suddenly becomes colder than normal operating temperature, a reduction in the temperature of the dilute absorbent solution leaving the absorber will result. This, in turn, will reduce the temperature of the concentrated absorbent solution in the heat exchanger below the crystallization point and will begin to block the heat exchanger. Overfiring the generator, resulting in supersaturation of the absorbent solution, will also cause crystallization blockage of heat exchange passages.

It is desirable to prevent any of the above conditions from ever occurring. However, because of malfunction or accident, it is impossible to prevent crystallization in the heat exchanger at all times. When crystallization and heat exchange blockage occur, a practical prior method of clearing the heat exchanger passages had been to heat them with an external heat source and liquify the absorbent solution therein. However, this solution is unacceptable because it requires significant interruption of the absorption machine operation. Other prior crystallization detection and prevention systems incorporated the use of mechanical float valves in the concentrated absorbent solution flow passages that would be activated when flow began to reverse due to crystallization. However, these mechanical systems have proven to be unreliable and expensive.

Therefore, it is an object of the present invention to provide a reliable and inexpensive apparatus and method for detecting crystallization of concentrated absorbent solution in a heat exchanger of a two-stage absorption refrigeration machine.

It is a further object of the present invention to provide a method and apparatus for recovering from crystallization of the concentrated absorbent solution, once detected, without utilizing external heat sources.

BRIEF SUMMARY OF THE INVENTION

The present invention provides a method for detecting crystallization in a two-stage absorption refrigeration machine including a controller, an absorber, an evaporator, a high temperature generator, a low temperature generator, a condenser, a low temperature heat exchanger for placing concentrated absorbent solution from the high temperature and low temperature generators and dilute absorbent solution from the absorber in a heat exchange relationship, a first passage directing concentrated absorbent solution through the low temperature heat exchanger, a second passage directing concentrated absorbent solution from the low temperature generator to the first passage, a third passage for directing concentrated absorbent solution from the high temperature generator to the first passage, a fourth passage for directing concentrated absorbent solution from the low temperature generator to the high temperature generator, a second passage temperature sensor for sensing the temperature of the concentrated absorbent solution in the second passage, a third passage temperature sensor for sensing the temperature of the concentrated absorbent solution in the third passage, and a fourth passage temperature sensor for sensing the temperature of the concentrated absorbent solution in the fourth passage.

The absorption refrigeration machine also includes an evaporator spray pump delivering dilute refrigerant from an evaporator refrigerant collector to at least one evaporator spray nozzle, an absorber spray pump delivering concentrated absorbent solution to at least one absorber spray nozzle, a fifth passage directing concentrated absorbent solution from the low temperature heat exchanger to the absorber, a sixth passage directing dilute absorbent solution from the collector to the absorber spray pump, and a valve controlled by the controller disposed in the sixth passage controlling flow of dilute absorbent solution in the sixth passage. A fifth passage temperature sensor that senses the temperature of the concentrated absorbent solution in the fifth passage between the low temperature heat exchanger and the absorber.

In normal operation, the temperature sensed by the fourth passage temperature sensor is substantially equal to the temperature sensed by the second passage temperature sensor, and the valve in the sixth passage is closed. When crystallization begins to block the first passage, the temperature sensed by the second passage temperature sensor begins to exceed the temperature sensed by the fourth temperature sensor. According to the present crystallization detection method, a crystallization alert is issued when the temperature sensed by the second passage temperature sensor is substantially equal to the average of the temperature sensed by the fourth temperature sensor and the temperature sensed by the third passage temperature sensor. This temperature is called the trip temperature. When the temperature sensed by the second passage temperature sensor meets or exceeds the trip temperature, i.e., crystallization is detected in the low temperature heat exchanger, then the control system goes into crystallization recovery mode.

According to the present invention, during the crystallization recovery mode, the control system completes the following steps:

1. concentrating of absorbent solution in both the low temperature and high temperature generators is temporarily halted by deactivating heat to the source;
2. the circulation of absorbent solution is temporarily halted by deactivating all system pumps;
3. the valve in the sixth passage between the evaporator and the absorber spray pump is opened to allow flow of dilute absorbent solution from the collector to the absorber spray pump;
4. after about 3 minutes of deactivation, the low temperature generator and high temperature generator pumps are reactivated for approximately 5 minutes to partially flush the high concentration absorbent solution that caused crystallization;
5. the low temperature generator and high temperature generator pumps are again deactivated for approximately 3 minutes to counteract any recrystallization that may have occurred during flushing;
6. all system pumps are reactivated, the valve is closed, and the control system adjusts the heat input at both the high temperature and low temperature generators such that the temperature of the concentrated absorbent solution between the low temperature heat exchanger and the absorber is maintained at a level such that the margin between the crystallization temperature of the concentrated solution in this region and the actual temperature is increased by 5° F. (about 3° C.) over the previous margin.

The control system will automatically go through the recovery cycle twice. When crystallization is detected for the third time, all operation of the absorption refrigeration machine will be stopped, as this indicates a systemic problem that must be corrected.

DETAILED DESCRIPTION OF THE INVENTION

Figure 1:
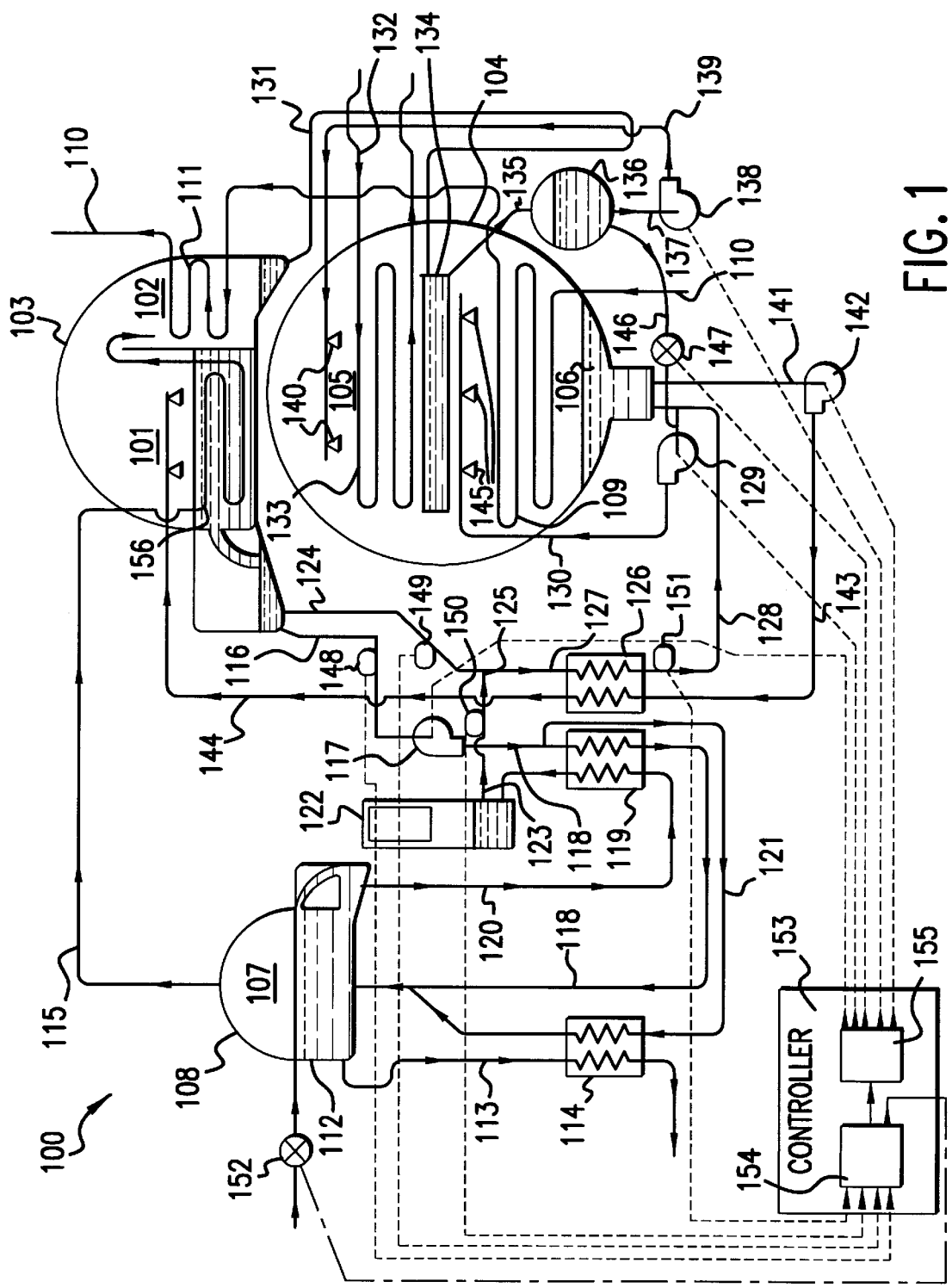
FIG. 1 is a schematic illustration of a two-stage absorption refrigeration machine employing an embodiment of the present invention.

Referring to FIG. 1 a two-stage absorption refrigeration machine 100 includes a low temperature generator 101 and a condenser 102 which are enclosed in a first fluid tight shell 103. A second fluid tight shell 104 contains an evaporator 105 and an absorber 106. A high temperature generator 107 is enclosed in a third fluid tight shell 108. The absorber 106 contains a heat exchanger 109 which is supplied with cooling fluid through a passage 110, which also passes through the condenser 102, from a cooling fluid source (not shown). The cooling fluid leaves the absorber heat exchanger 109 via the passage 110 and enters condenser heat exchanger 111 and is returned to the cooling fluid source (not shown).

Various suitable types of refrigerants and absorbents may be used in the present two-stage absorption machine. A solution of lithium bromide absorbent in a refrigerant such as water is satisfactory. The term "concentrated solution" as used herein means a solution which is concentrated in absorbent. A "dilute solution" is one which is dilute in absorbent.

Steam flows from a source such as a boiler (not shown), through the high temperature generator heat exchanger 112 of the high temperature generator 107 via a steam passage 113. The steam passage 113 returns condensate to the steam source through a condensate heat exchanger 114. It is, of course, understood that other suitable sources of heat can be used to concentrate absorbent solution in the high temperature generator 107. (For example, the high temperature generator might be directly heated by a burner). Heat from condensing steam in the high temperature generator heat exchanger 112 causes the refrigerant solution in the high temperature generator 107 to boil, thereby producing refrigerant vapor and concentrating the absorbent solution.

Refrigerant vapor produced in the high temperature generator 107 is directed to the low temperature generator heat exchanger 156 in heat the low temperature generator 101 through a refrigerant vapor passage 115 and is then condensed in the condenser 102. The dilute solution in the low temperature generator 101 is boiled through heat exchange with the refrigerant vapor in the refrigerant vapor passage 115 and is also condensed in the condenser 102. At least a portion of the concentrated solution generated in the low temperature generator 101 is delivered through a fourth passage 116 to a high temperature generator pump 117 and pumped through a passage 118 to a high temperature heat exchanger 119. In the high temperature heat exchanger 119 at least a portion of the concentrated solution in passage 118 is preheated on its way to the high temperature generator 107 through heat exchange with the high temperature concentrated solution flowing in a passage 120. A portion of the concentrated solution flowing in the passage 118 is directed through a passage 121 to the condensate heat exchanger 114 where it is brought into a heat exchange relationship with the condensate in the condensate passage 113 before rejoining the solution in the passage 118 and being delivered to the high temperature generator 107.

The high temperature concentrated solution is directed from the high temperature generator 107 through the high temperature heat exchanger 119 to a high temperature concentrated solution accumulator 122 via the passage 120. The high temperature concentrated solution from the accumulator 122 is directed through a third passage 123 to be joined with low temperature concentrated solution leaving the low temperature generator 101 via a second passage 124 at a mixing point 125. From the mixing point 125, the combined concentrated solution is directed to the low temperature heat exchanger 126 via a first passage 127, and subsequently delivered to the absorber 106 through a fifth passage 128, an absorber spray pump 129, and a passage 130.

Liquid refrigerant from the condenser 102 passes through a passage 131 to the evaporator 105. The liquid refrigerant is vaporized in the evaporator 105, thus removing heat from a chilled fluid flowing in a passage 132 through the evaporator heat exchanger 133. This chilled fluid is circulated to a heat load, such as a building requiring cooling.

Since the absorber 106 is in vapor communication with the evaporator 105, the absorbent solution can absorb refrigerant vapor from the evaporator 105, thus removing heat from the evaporator section. At least a portion of the refrigerant liquid dropping from the evaporator heat exchanger 133 is collected in a collector 134. The refrigerant liquid flows from the collector 134 through a passage 135 to a storage vessel 136. Via a passage 137, refrigerant liquid is delivered from the storage vessel 136 to the evaporator spray pump 138 which delivers the refrigerant liquid through a passage 139 to be sprayed in the evaporator 105 through nozzles 140.

Dilute solution from the absorber 106 flows through a passage 141, a low temperature generator pump 142, a passage 143, the low temperature heat exchanger 126 and a passage 144 to the low temperature generator 101, where it is concentrated. In the low temperature heat exchanger 126 the concentrated solution is brought into a heat exchange relationship with the dilute solution from the absorber 106 which is being delivered to the low temperature generator 101, whereby the dilute solution is preheated.

From the low temperature heat exchanger 126 the concentrated solution flows through fifth passage 128 to the absorber spray pump 129. The concentrated solution is forced by the absorber spray pump 129 through the passage 130 and is discharged into the absorber 106 through the absorber spray nozzles 145. A passage 146 is disposed between the storage vessel 136 and the absorber spray pump 129. Flow between the storage vessel 136 and the absorber spray pump 129 is controlled by a valve 147 which is normally closed.

When crystallization occurs in the concentrated solution in the low temperature heat exchanger 126, then the flow of concentrated solution in the first passage 127 is reversed due to crystallization blockage. This effect makes it possible to detect crystallization by monitoring the temperatures of certain solution streams.

According to the present invention, a fourth passage temperature sensor 148 senses the temperature of the concentrated solution between the low temperature generator 101 and the high temperature generator pump 117 in the fourth passage 116. A second passage temperature sensor 149 senses the temperature of the concentrated solution in the second passage 124 between the low temperature generator 101 and the mixing point 125. A third passage temperature sensor 150 senses the temperature of the high temperature concentrated solution in the third passage 123. A fifth passage temperature sensor 151 senses the temperature of the concentrated solution in the fifth passage 128.

Operation of the absorption refrigeration machine is typically controller 153 having processing circuitry, for example, a microprocessor. The controller 153 may be of the feedback type that incorporates an input signal receiver 154 and an output signal generator 155. Output control signals are generated by the signal generator 155 in response to input signals received by the input signal receiver 154.

During normal steady state operation, the temperature sensed by the fourth passage temperature sensor 148 is substantially equal to the temperature sensed by the second passage temperature sensor 149, and the control system modulates the heat input into the high temperature generator 107 such that the temperature of the concentrated solution in the fifth passage 128 sensed by the fifth passage temperature sensor 151 is maintained at about 15° F. higher than the concentrated solution's crystallization temperature.

When crystallization of the concentrated solution in the low temperature heat exchanger 126 occurs, the flow through the first passage 127 begins to reverse due to blockage. Accordingly, the temperature sensed by the second passage temperature sensor 149 begins to exceed that sensed by fourth passage temperature sensor 148. According to the present invention, a crystallization alert is issued and corrective action is indicated when the temperature sensed by the second passage temperature sensor 149 meets or exceeds the mathematical average of the temperature sensed by the fourth passage temperature sensor 148 and the temperature sensed by the third passage temperature sensor 150 as determined by the following formula:

$$T_{TRIP} = \frac{T_3 + T_4}{2}$$

Where:
$T_3$ is the temperature sensed by the third passage temperature sensor; and
$T_4$ is the temperature sensed by the fourth passage temperature sensor;

This temperature value is called the "trip temperature."
If the temperature sensed by the second passage temperature sensor 149 meets or exceeds the trip temperature, then the control system begins to take action to recover from crystallization of the concentrated solution in the low temperature heat exchanger 126.

In the recovery mode, the control system takes the following steps:

1. heat sources to the low temperature generator 101 and the high temperature generator 107 are deactivated to stop producing concentrated solution. In the embodiment of FIG. 1, this would be achieved by interrupting the steam supply to the high temperature generator 107 by closing a steam valve 152;
2. the circulation of absorbent solution is stopped by deactivating the high temperature generator pump 117, the low temperature generator pump 142, the absorber spray pump 129 and the evaporator spray pump 138;
3. the solution in the absorber is diluted with dilute solution by opening the valve 147 to allow dilute solution from the storage vessel 136 to flow to the absorber spray pump 129;
4. after about 3 minutes, the concentrated solution that in crystallized is flushed by reactivating the low temperature generator pump 142 and the high temperature generator pump 117 for about 5 minutes;
5. the low temperature generator pump 142 and the high temperature generator pump 117 are again deactivated for about 3 minutes (this is done because the reactivation of these pumps according to step 4 may result in temporary recrystallization);
6. the heat source to the high temperature generator 107 is reactivated. However, the control system adjusts the heat input to the high temperature generator 107 and the low temperature generator 101 such that the temperature of the concentrated solution leaving the low temperature heat exchanger 126 via the fifth passage 128 is maintained at a level such that the margin between the crystallization temperature of the concentrated solution in this region and the actual temperature is increased by about 5° F. (3°) over the previous control margin; and
7. after the 3 minute period according to step 5 has elapsed, all pumps are reactivated.

The control system is programmed to allow the system to go through the recovery sequence a predetermined number of times, e.g., twice. If crystallization is detected more times than this predetermined number, the control system will shut down all operation of the absorption machine so that required maintenance can be performed to correct the recurring crystallization.

Figure 2:
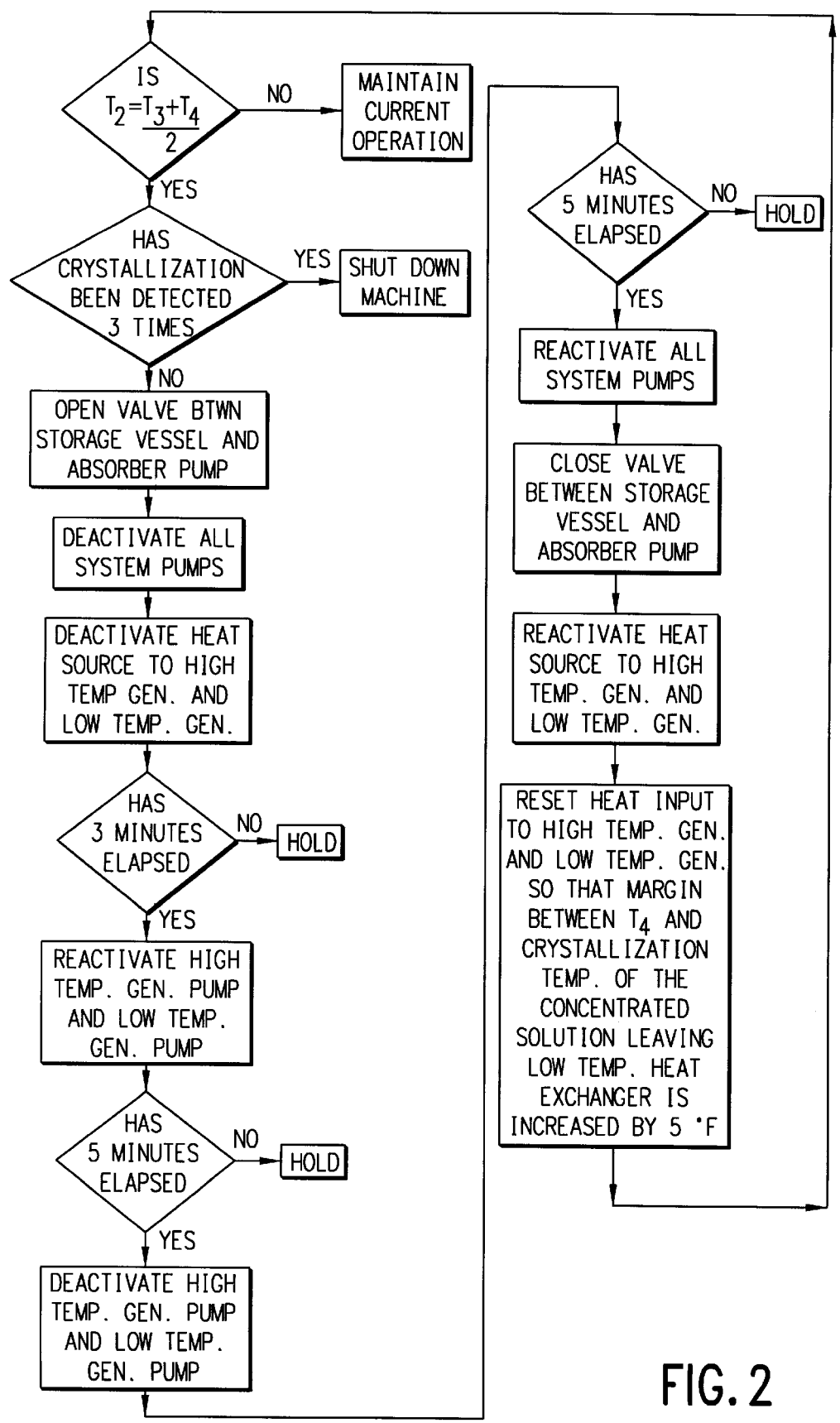
FIG. 2 is a flow chart illustrating the recovery control system according to the present invention.

FIG. 2 is a flowchart illustration of the recovery sequence of the present invention described above.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for detecting crystallization in a two-stage absorption refrigeration machine (100) comprising a controller (153), an absorber (106), an evaporator (105), a high temperature generator (107), a low temperature generator (101), a condenser (102), a low temperature heat exchanger (126) for placing concentrated absorbent solution from the high temperature and low temperature generators (107, 101) and dilute absorbent solution from the absorber (106) in a heat exchange relationship, a first passage (127) directing concentrated absorbent solution through the low temperature heat exchanger (126), a second passage (124) directing concentrated absorbent solution from the low temperature generator (101) to the first passage (127), a third passage (123) for directing concentrated absorbent solution from the high temperature generator (107) to the first passage (127), a fourth passage (116) for directing concentrated absorbent solution from the low temperature generator to the high temperature generator, the method comprising the steps of:

a. sensing the temperature of the concentrated absorbent solution in the second passage (124);

b. sensing the temperature of the concentrated absorbent solution in the third passage (123);

c. sensing the temperature of the concentrated absorbent solution in the fourth passage (116); and d. generating a control signal alerting of crystallization in the concentrated absorbent solution in the first passage (127) when the temperature of the concentrated absorbent solution in the second passage (124) meets or exceeds the average of the temperature of the concentrated absorbent solution in the third passage (123) and the temperature of the concentrated solution in the fourth passage (116), the average determined according to the formula:

$$T_{average} = \frac{T_3 + T_4}{2}$$

where $T_3$ is the temperature of the concentrated absorbent solution in the third passage (123) and $T_4$ is the temperature of the concentrated absorbent solution in the fourth passage (116).

2. An apparatus for detecting crystallization in a two-stage absorption refrigeration machine (100) comprising:

a. a controller (153), b. an absorber (106), c. an evaporator (105), d. a high temperature generator (107), e. a low temperature generator (101), f. a condenser (102), g. a low temperature heat exchanger (126) for placing concentrated absorbent solution from the high temperature and low temperature generators (107, 101) and dilute absorbent solution from the absorber in a heat exchange relationship, h. a first passage (127) directing concentrated absorbent solution through the low temperature heat exchanger (126), i. a second passage (124) directing concentrated absorbent solution from the low temperature generator to the first passage, j. a third passage (123) for directing concentrated absorbent solution from the high temperature generator (107) to the first passage (127), k. a fourth passage (116) for directing concentrated absorbent solution from the low temperature generator (101) to the high temperature generator (107), l. a second passage temperature sensor (149) for sensing the temperature of the concentrated absorbent solution in the second passage (124);

m. a third passage temperature sensor (150) for sensing the temperature of the concentrated absorbent solution in the third passage (123);

n. a fourth passage temperature sensor (148) for sensing the temperature of the concentrated absorbent solution in the fourth passage (116); and o. a signal generator (155) for generating a control signal alerting of crystallization in the concentrated absorbent solution in the first passage (127) when the temperature of the concentrated absorbent solution in the second passage (124) meets or exceeds the average of the temperature of the concentrated absorbent solution in the third passage (123) and the temperature of the concentrated solution in the fourth passage (116), the average determined according to the formula:

$$T_{average} = \frac{T_3 + T_4}{2}$$

where $T_3$ is the temperature of the concentrated absorbent solution in the third passage (123) and $T_4$ is the temperature of the concentrated absorbent solution in the fourth passage (116).

3. A method for detecting and recovering from crystallization in a two-stage absorption refrigeration machine (100) comprising a controller (153), an absorber (106), an evaporator (105) having a collector (134) for collecting dilute absorbent solution, a high temperature generator (107) heated by a first heat source (112), a low temperature generator (101) heated by a second heat source (156), a low temperature heat exchanger (126) for placing concentrated absorbent solution from the high temperature and low temperature generators (107, 101) and dilute absorbent solution from the absorber (106) in a heat exchange relationship, a high temperature generator pump (117) delivering concentrated absorbent solution from the low temperature generator (101) to the high temperature generator (107), a low temperature generator pump (142) delivering dilute absorbent solution from the absorber (106) to the low temperature heat exchanger (126), an evaporator spray pump (138) delivering dilute refrigerant from the collector (134) to at least one evaporator spray nozzle (140), an absorber spray pump (129) delivering concentrated absorbent solution to at least one absorber spray nozzle (145), a first passage (127) directing concentrated absorbent solution through the low temperature heat exchanger (126), a second passage (124) directing concentrated absorbent solution from the low temperature generator (101) to the first passage (127), a third passage (123) for directing concentrated absorbent solution from the high temperature generator (107) to the first passage (127), a fourth passage (116) for directing concentrated absorbent solution from the low temperature generator (101) to the high temperature generator (107), a fifth passage (128) directing concentrated absorbent solution from the low temperature heat exchanger (126) to the absorber (106), a sixth passage (135, 146) directing dilute absorbent solution from the collector (134) to the absorber spray pump (129), and a valve (147) controlled by the controller (153) disposed in the sixth passage (135, 146) controlling flow of dilute absorbent solution in the sixth passage (135, 146), the method comprising the steps of:

a. sensing the temperature of the concentrated absorbent solution in the second passage (124);

b. sensing the temperature of the concentrated absorbent solution in the third passage (123);

c. sensing the temperature of the concentrated absorbent solution in the fourth passage (116); and d. generating a control signal alerting of crystallization in the concentrated absorbent solution in the first passage (127) when the temperature of the concentrated absorbent solution in the second passage (124) meets or exceeds the average of the temperature of the concentrated absorbent solution in the third passage (123) and the temperature of the concentrated solution in the fourth passage (116), the average determined according to the formula:

$$T_{average} = \frac{T_3 + T_4}{2}$$

where $T_3$ is the temperature of the concentrated absorbent solution in the third passage (123) and $T_4$ is the temperature of the concentrated absorbent solution in the fourth passage (116);

e. transmitting the control signal to the controller (153), in response to the control signal, the controller (153) generating and issuing response signals to complete the crystallization recovery sequence steps of:

i. deactivating the first and second heat sources (112, 156);

ii. deactivating the low temperature generator pump (142), the high temperature generator pump (117), the absorber spray pump (129), and the evaporator spray pump (138);

iii. actuating the valve (147) to open thereby allowing dilute absorbent solution to flow from the collector (134), through the sixth passage (135, 146) to the absorber spray pump (129);

iv. reactivating the low temperature generator pump (142) and the high temperature generator pump (117) for about five minutes;

v. deactivating the low temperature generator pump (142) and the high temperature generator pump (117) for about three minutes;

vi. reactivating the low temperature generator pump (142), the high temperature generator pump (117), the absorber spray pump (129) and the evaporator spray pump (138);

vii. actuating the valve (147) to close; and viii. reactivating the first and second heat sources (112, 156) and modulating the first and second heat sources (112, 156) such that the difference between the crystallization temperature of the concentrated absorbent solution in the fifth passage (128) and the temperature of the concentrated absorbent solution in the fifth passage (128) is increased by 5° F.

4. An apparatus for detecting and recovering from crystallization in a two-stage absorption refrigeration machine comprising:

a. a controller (153), b. an absorber (106), c. an evaporator (105) having a collector (134) for collecting dilute absorbent solution, d. a high temperature generator (107) heated by a first heat source (112), e. a low temperature generator (101) heated by a second heat source (156), f. a low temperature heat exchanger (126) for placing concentrated absorbent solution from the high temperature and low temperature generators (107, 101) and dilute absorbent solution from the absorber (106) in a heat exchange relationship, g. a high temperature generator pump (117) delivering concentrated absorbent solution from the low temperature generator (101) to the high temperature generator (107), h. a low temperature generator pump (142) delivering dilute absorbent solution from the absorber (106) to the low temperature heat exchanger (126), i. an evaporator spray pump (138) delivering dilute refrigerant from the collector (134) to at least one evaporator spray nozzle (140), j. an absorber spray pump (129) delivering concentrated absorbent solution to at least one absorber spray nozzle (101), k. a first passage (127) directing concentrated absorbent solution through the low temperature heat exchanger (126), l. a second passage (124) directing concentrated absorbent solution from the low temperature generator (101) to the first passage (127), m. a third passage (123) for directing concentrated absorbent solution from the high temperature generator (107) to the first passage (127), n. a fourth passage (116) for directing concentrated absorbent solution from the low temperature generator (101) to the high temperature generator (107), o. a fifth passage (128) directing concentrated absorbent solution from the low temperature heat exchanger (126) to the absorber (106), p. a sixth passage (135, 146) directing dilute absorbent solution from the collector (134) to the absorber spray pump (129), q. and a valve (147) controlled by the controller (153) disposed in the sixth passage (135, 146) controlling flow of dilute absorbent solution in the sixth passage (135, 146), r. a second passage temperature sensor (149) for sensing the temperature of the concentrated absorbent solution in the second passage (124);

s. a third passage temperature sensor (150) for sensing the temperature of the concentrated absorbent solution in the third passage (123);

t. a fourth passage temperature sensor (148) for sensing the temperature of the concentrated absorbent solution in the fourth passage (116);

s. a control signal generator (155) for generating a control signal alerting of crystallization in the concentrated absorbent solution in the first passage (127) when the temperature of the concentrated absorbent solution in the second passage (124) meets or exceeds the average of the temperature of the concentrated absorbent solution in the third passage (123) and the temperature of the concentrated solution in the fourth passage (116), the average determined according to the formula:

$$T_{average} = \frac{T_3 + T_4}{2}$$

where $T_3$ is the temperature of the concentrated absorbent solution in the third passage (123) and $T_4$ is the temperature of the concentrated absorbent solution in the fourth passage (116);

t. a control signal receiver (154) for receiving the control signal to the controller (153), in response to the control signal, the controller (153) generating and issuing response signals to complete the crystallization recovery sequence steps of:
  i. deactivating the first and second heat sources (112, 156);
  ii. deactivating the low temperature generator pump (142), the high temperature generator pump (117), the absorber spray pump, and the evaporator spray pump (138);
  iii. actuating the valve (147) to open thereby allowing dilute absorbent solution to flow from the collector (134), through the sixth passage (135, 146) to the absorber spray pump (129);
  iv. reactivating the low temperature generator pump (142) and the high temperature generator pump (117) for about five minutes;
  v. deactivating the low temperature generator pump (142) and the high temperature generator pump (117) for about three minutes;
  vi. reactivating the low temperature generator pump (142), the high temperature generator pump (117), the absorber spray pump (129) and the evaporator spray pump (135);
  vii. actuating the valve (147) to close; and
  viii. reactivating the first and second heat sources (112, 156) and modulating the first and second heat sources (112, 156) such that the difference between the crystallization temperature of the concentrated absorbent solution in the fifth passage (128) and the temperature of the concentrated absorbent solution in the fifth passage (128) is increased by 5° F.

5. The apparatus of claim 4 wherein the first and second heat sources (112, 156) comprise steam.

6. The apparatus of claim 4 wherein the first heat source (112) comprises steam and the second heat source (156) comprises high temperature concentrated absorbent solution.

7. The apparatus of claim 4 wherein the at least one evaporator spray nozzle (140) comprises a plurality of evaporator spray nozzles.

8. The apparatus of claim 4 wherein the at least one absorber spray nozzle (145) comprises a plurality of absorber spray nozzles.

9. The apparatus of claim 4 further comprising a storage vessel (136) for storing dilute refrigerant, the storage vessel (136) disposed between the absorber spray pump (129) and the collector (134) in fluid communication with the sixth passage (135, 146).

* * * * *